US009106171B2

(12) United States Patent
Bartholomew et al.

(10) Patent No.: US 9,106,171 B2
(45) Date of Patent: Aug. 11, 2015

(54) POWER SUPPLY COMPENSATION FOR AN ACTUATOR (71) Applicant: Honeywell International Inc., Morristown, NJ (US)

(72) Inventors: John C. Bartholomew, Shawano, WI (US); Mark D. Bokusky, Eden Prairie, MN (US); Steffen J. Moeller, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 140 days.

(21) Appl. No.: 13/896,901

(22) Filed: May 17, 2013

(65) Prior Publication Data

US 2014/0340016 A1    Nov. 20, 2014

(51) Int. Cl.
G05D 23/00    (2006.01)
H02P 29/00    (2006.01)

(52) U.S. Cl.
CPC .................................. *H02P 29/0044* (2013.01)

(58) Field of Classification Search
USPC ............ 318/400.01, 700, 701, 727, 432, 471, 318/472, 678, 679, 680, 681, 682, 268, 779, 318/799, 400.14, 400.15, 671; 700/276, 700/278; D23/325, 383, 421; 62/156; 74/473.12; 454/28, 265, 290; 219/757, 219/110, 251; 165/59; 335/23
See application file for complete search history.

(56) References Cited

U.S. PATENT DOCUMENTS

| | | |
|---|---|---|
| 3,829,848 A | 8/1974 | Eickelberg et al. |
| 4,129,847 A | 12/1978 | Teichert |
| 4,302,931 A | 12/1981 | White et al. |
| 4,549,446 A | 10/1985 | Beeson |
| 4,628,268 A | 12/1986 | Matsubara |
| 4,652,417 A | 3/1987 | Sutherland et al. |
| 4,673,920 A | 6/1987 | Ferguson et al. |
| 4,688,183 A | 8/1987 | Carll et al. |
| 4,742,475 A | 5/1988 | Kaiser et al. |
| 4,794,314 A | 12/1988 | Janu et al. |
| 4,795,867 A | 1/1989 | Ohi et al. |
| 4,854,852 A | 8/1989 | Patton et al. |
| 5,025,206 A | 6/1991 | Germer et al. |

(Continued)

FOREIGN PATENT DOCUMENTS

| | | |
|---|---|---|
| DE | 202004011803 | 12/2004 |
| EP | 0511828 | 11/1992 |

(Continued)

OTHER PUBLICATIONS

"555 Timer IC," Wikipedia, the Free Encyclopedia, 9 pages, Aug. 7, 2012.

(Continued)

*Primary Examiner* — Antony M Paul (74) *Attorney, Agent, or Firm* — Seager Tufte & Wickhem LLC.

(57) ABSTRACT

A mechanism for compensating power to a motor or actuator. Compensation may counter the effects of changing voltage levels of power to the motor and varying temperatures at the motor. An output of a wave generator may be input to a comparator along with a level of voltage representing the temperatures and voltage levels. An output may be a power signal for driving the motor at a constant speed and/or torque which can increase a maintenance-free lifetime of the motor and actuator.

17 Claims, 4 Drawing Sheets

(56) References Cited

U.S. PATENT DOCUMENTS

| | | |
|---|---|---|
| 5,081,405 A | 1/1992 | Nelson |
| 5,153,493 A | 10/1992 | Jornod et al. |
| 5,159,534 A | 10/1992 | Hudson et al. |
| 5,180,959 A | 1/1993 | Christopher |
| 5,318,516 A | 6/1994 | Cosmescu |
| 5,416,781 A | 5/1995 | Ruiz |
| 5,422,553 A | 6/1995 | MacLennan et al. |
| 5,431,182 A | 7/1995 | Brown |
| 5,446,677 A | 8/1995 | Jensen et al. |
| 5,454,273 A | 10/1995 | Smith |
| 5,465,031 A | 11/1995 | Nilssen |
| 5,584,319 A | 12/1996 | Cholin |
| 5,621,398 A | 4/1997 | Blair et al. |
| 5,682,329 A | 10/1997 | Seem et al. |
| 5,711,480 A | 1/1998 | Zepke et al. |
| 5,744,925 A | 4/1998 | Madsen |
| 5,848,609 A | 12/1998 | Marchesseault et al. |
| 6,025,788 A | 2/2000 | Diduck |
| 6,035,878 A | 3/2000 | Adams et al. |
| 6,051,948 A | 4/2000 | Vepy |
| 6,059,046 A | 5/2000 | Lowry |
| 6,121,735 A | 9/2000 | Igeta et al. |
| 6,178,997 B1 | 1/2001 | Adams et al. |
| 6,249,100 B1 * | 6/2001 | Lange .................. 318/471 |
| RE37,589 E * | 3/2002 | Mueller ............. 318/400.26 |
| 6,415,617 B1 | 7/2002 | Seem |
| 6,431,203 B1 | 8/2002 | Zhu et al. |
| 6,431,231 B1 | 8/2002 | Braaten et al. |
| 6,443,422 B1 | 9/2002 | Gluf, Jr. |
| 6,505,991 B2 | 1/2003 | Roman |
| 6,651,952 B1 | 11/2003 | Hightower et al. |
| 6,725,976 B2 | 4/2004 | Oh et al. |
| 6,772,018 B2 | 8/2004 | Juntunen et al. |
| 6,838,988 B2 | 1/2005 | Lennartz et al. |
| 6,851,620 B2 | 2/2005 | Hill |
| 6,915,171 B2 | 7/2005 | Mayer |
| 6,917,178 B2 | 7/2005 | Takeuchi et al. |
| 6,922,123 B2 | 7/2005 | Lalonde et al. |
| 6,954,044 B2 | 10/2005 | McMillan et al. |
| 6,979,965 B2 | 12/2005 | McMillan et al. |
| 7,021,072 B2 | 4/2006 | McMillan et al. |
| 7,024,282 B2 | 4/2006 | Coogan et al. |
| 7,031,880 B1 | 4/2006 | Seem et al. |
| 7,033,268 B2 | 4/2006 | Caliendo et al. |
| 7,058,542 B2 | 6/2006 | Hauhia et al. |
| 7,066,273 B2 | 6/2006 | Tan |
| 7,079,831 B2 | 7/2006 | Schwartzman et al. |
| 7,105,949 B2 | 9/2006 | Wang et al. |
| 7,188,481 B2 | 3/2007 | DeYoe et al. |
| 7,241,218 B2 | 7/2007 | Van Becelaere et al. |
| 7,265,512 B2 | 9/2007 | McMillan et al. |
| 7,378,980 B2 | 5/2008 | McFarland |
| 7,401,541 B2 | 7/2008 | McCarroll et al. |
| 7,431,568 B2 * | 10/2008 | Brown et al. ............ 417/44.1 |
| 7,442,068 B2 | 10/2008 | Hammer et al. |
| 7,446,494 B2 | 11/2008 | Grabinger et al. |
| 7,451,759 B2 | 11/2008 | Weiss et al. |
| 7,460,013 B1 | 12/2008 | Osborne et al. |
| 7,476,988 B2 | 1/2009 | Mulhouse et al. |
| 7,477,028 B2 | 1/2009 | Bokusky et al. |
| 7,492,233 B2 | 2/2009 | Grabinger |
| 7,525,266 B2 | 4/2009 | Bolusky et al. |
| 7,533,635 B2 | 5/2009 | Bradley et al. |
| 7,557,549 B2 | 7/2009 | Underhill |
| 7,586,279 B2 | 9/2009 | Theunissen et al. |
| 7,622,828 B2 | 11/2009 | Grabinger et al. |
| 7,633,393 B2 | 12/2009 | Bonne |
| 7,636,613 B2 | 12/2009 | Borah et al. |
| 7,639,127 B2 | 12/2009 | Kastli |
| 7,653,459 B2 | 1/2010 | Pouchak et al. |
| 7,664,573 B2 | 2/2010 | Ahmed |
| 7,672,913 B2 | 3/2010 | Kaplan et al. |
| 7,697,492 B2 | 4/2010 | Petite |
| 7,774,441 B2 | 8/2010 | Frutiger et al. |
| 7,784,291 B2 | 8/2010 | Butler et al. |
| 7,787,994 B2 | 8/2010 | Wacker |
| 7,798,170 B2 | 9/2010 | Hotz et al. |
| 7,802,734 B2 | 9/2010 | Stanimirovic |
| 7,831,338 B1 | 11/2010 | Haydu |
| 7,840,311 B2 | 11/2010 | Grohman |
| 7,852,765 B2 | 12/2010 | Neuman et al. |
| 7,876,217 B2 | 1/2011 | Laackmann et al. |
| 7,881,678 B2 | 2/2011 | Menden et al. |
| 7,891,241 B2 | 2/2011 | McSheffrey et al. |
| 7,922,149 B2 | 4/2011 | Anderson et al. |
| 7,944,672 B1 | 5/2011 | Chiang |
| 7,966,438 B2 | 6/2011 | Punyko et al. |
| 8,031,650 B2 | 10/2011 | Petite et al. |
| 8,084,980 B2 | 12/2011 | Carlson et al. |
| 8,084,982 B2 | 12/2011 | Grabinger et al. |
| 8,147,302 B2 | 4/2012 | Desrochers et al. |
| 8,218,547 B2 | 7/2012 | Van Steen et al. |
| 8,588,983 B2 | 11/2013 | Grabinger et al. |
| 2002/0152298 A1 | 10/2002 | Kikta et al. |
| 2003/0018398 A1 | 1/2003 | Juntunen et al. |
| 2003/0052180 A1 | 3/2003 | Huhn et al. |
| 2003/0178257 A1 | 9/2003 | Oh et al. |
| 2004/0124797 A1 | 7/2004 | Takeuchi et al. |
| 2004/0212336 A1 | 10/2004 | McMillan et al. |
| 2005/0127861 A1 | 6/2005 | McMillan et al. |
| 2006/0035580 A1 | 2/2006 | Anderson et al. |
| 2006/0130502 A1 | 6/2006 | Wruck et al. |
| 2007/0120664 A1 | 5/2007 | Bilbrey et al. |
| 2007/0176570 A1 | 8/2007 | Bokusky et al. |
| 2007/0226318 A1 | 9/2007 | Rydberg et al. |
| 2008/0051024 A1 | 2/2008 | Caliendo et al. |
| 2008/0111512 A1 | 5/2008 | Theunissen et al. |
| 2008/0244104 A1 | 10/2008 | Clemente |
| 2008/0258253 A1 | 10/2008 | Fey et al. |
| 2008/0316039 A1 | 12/2008 | White et al. |
| 2009/0005917 A1 | 1/2009 | Hole |
| 2009/0033513 A1 | 2/2009 | Salsbury et al. |
| 2009/0039813 A1 * | 2/2009 | Yamada et al. ............ 318/434 |
| 2009/0082880 A1 | 3/2009 | Saunders |
| 2009/0101725 A1 | 4/2009 | Dolan et al. |
| 2010/0077254 A1 | 3/2010 | Erdmann et al. |
| 2010/0102973 A1 | 4/2010 | Grohman et al. |
| 2010/0106262 A1 | 4/2010 | Schreyer et al. |
| 2010/0106836 A1 | 4/2010 | Schreyer et al. |
| 2010/0109675 A1 | 5/2010 | Wong et al. |
| 2010/0121613 A1 | 5/2010 | Rosca et al. |
| 2010/0134934 A1 | 6/2010 | Matsubara et al. |
| 2010/0141243 A1 | 6/2010 | Divicino et al. |
| 2010/0194326 A1 | 8/2010 | Carlson et al. |
| 2010/0253270 A1 | 10/2010 | Kuster et al. |
| 2011/0070904 A1 | 3/2011 | McFarland |
| 2012/0229064 A1 * | 9/2012 | Jeung ................... 318/400.13 |
| 2013/0082634 A1 | 4/2013 | Bokusky et al. |
| 2013/0103324 A1 | 4/2013 | Waseen et al. |
| 2013/0113402 A1 | 5/2013 | Grabinger et al. |
| 2013/0116832 A1 | 5/2013 | Grabinger et al. |
| 2013/0116833 A1 | 5/2013 | Grabinger et al. |
| 2013/0116834 A1 | 5/2013 | Grabinger et al. |

FOREIGN PATENT DOCUMENTS

| | | |
|---|---|---|
| EP | 1170036 | 1/2002 |
| EP | 1901145 | 3/2008 |
| EP | 2241834 | 10/2010 |
| GB | 1172789 | 12/1969 |
| JP | 57086544 | 5/1982 |
| JP | 60091411 | 5/1985 |
| JP | 63257802 | 10/1988 |
| JP | 1215633 | 8/1989 |
| JP | 2009118155 | 5/2009 |
| WO | WO 2010000077 | 1/2010 |

OTHER PUBLICATIONS

Beckhoff New Automation Technology, "Application Note DK9222-0810-0035, I/O, Building Automation," 7 pages, Aug. 2010.

Belimo, "Belimo Gateway MP to Modbus RTU-UK24MOD," Product Information, 20 pages, Feb. 2010.

(56) References Cited

OTHER PUBLICATIONS

Belimo, "Damper Actuator Plug-In Description/Documentation #Tools-007-E_20.11.05," 11 pages, Nov. 20, 2005.

Belimo, "MP-Bus-Interface—for Belimo Damper Actuators," 16 pages, Oct. 2009.

Belimo, "Perfect for Each and Every Connection, Bus Integration of Actuators and Sensors in Heating, Ventilation, and Air Conditioning Systems," 10 pages, prior to Sep. 30, 2011.

Belimo, "Ring Bus Solution by Belimo, State of the Art System for Bus Integrated Fire Protection and Smoke Control," 6 pages, prior to Sep. 30, 2011.

U.S. Appl. No. 13/794,232, filed Mar. 11, 2013.

Delta Controls, "HVAC Application Controllers DVC-V322," Document Edition 2.0, 7 pages, Feb. 2005.

Distech Controls, "ECC-VAV/ECC-VVT easyCONTROLS LonMark Certified Application Specific Single Duct Variable Air Volume/Variable Volume Temperature Controllers," 5 pages, prior to Sep. 30, 2011.

Echelon, "LNS Plug-In Belimo," 1 page, 2011.

Honeywell, "3 Nm, 5 Nm Series Spring Return Direct Coupled Actuators, MS3103, MS3105, MS4103, MS4105, MS7403, MS7405, MS7503, MS7505, MS8103, MS8105," Installation Instructions, 12 pages, 2011.

Honeywell, "Advanced Control from a Unitary Controller," 8 pages, Mar. 2009.

Honeywell, "Jade Economizer Module (Model W7220)," Installation Instructions, 20 pages, 2010.

Honeywell, "ML4202, ML4302, ML4702, ML4802, ML8202, ML8302 Fast-Acting, Two-Position Actuators for Fire/Smoke Control Applications," Installation Instructions, 4 pages, 2005.

Honeywell, "SO5, S10, S20 Series Spring Return Direct Coupled Actuators, MS4105, MS4110, MS4120, MS71XX, MS7505, MS7510, MS7520, MS8105, MS8110, MS8120," Product Data, 16 pages, 2008.

Honeywell, "Spyder Lon Programmable, VAV/Unitary Controllers," Product Data, 24 pages, 2009.

Johnson Controls Unitary Products, "YCCS Zone Bypass Damper Assembly," 6 pages, 2008.

Microchip Technology, Inc., "Using PWM to Generate Analog Output AN538," 2 pages, 1997.

Motorola, "Triacs Silicon Bidirectional Triode Thyristors," 2 pages, prior to Sep. 30, 2011.

MP-Bus Technology by Belimo, "MP-Bus Convenient and Secure Integration of Belimo Actuator Drives," 1 page, prior to Sep. 30, 2011.

Noliac, "Noliac Acquires Piezo Actuator Drive Technology from Siemens," 2 pages, prior to Sep. 30, 2011.

On Semiconductor, "AND8054/D Designing RC Oscillator Circuits with Low Voltage Operational Amplifiers and Comparators for Precision Sensor Applications," 3 pages, Jul. 2001.

Siemens, "BACnet ATEC," Technical Specification Sheet Document No. 149-825, 4 pages, Apr. 9, 2010.

Siemens, "Siemens, BACnet VAV Actuator," Technical Specification Sheet Rev. AA, 5 pages, Jan. 2008.

Tridium, "Belimo and Tridium to Jointly Develop a Next Generation VAV Controller with Wireless Communications," 2 pages, May 15, 2008.

Wang et al., "Research on Reliability of a Hybrid Three-Redundant Electro-Mechanical Actuator," Proceedings of the 2009 IEEE International Conference on Mechatronics and Automation, Aug. 9-12, 2009.

Honeywell, "Spyder Sylk Enhanced, Advanced Control From a Unitary Controller," 8 pages, Mar. 2009.

Honeywell, "Spyder Sylk Enhanced," 11 pages, Oct. 2008.

ControlTrends Article Entitled, "Honeywell Zelix Actuators," 1 page, published on the internet Nov. 11, 2009.

Ruff, "Servo Motor Control Application on a Local Interconnection Network (LIN)," Rev. 1.0, Dec. 2005.

Siemens, "OpenAir—Robust Damper Actuators for Energy-Efficient Ventilation, Durable Actuators for HVAC Applications, Air Volume Controllers as well as Fire and Smoke Protection Dampers," 10 pages, 2011.

* cited by examiner

POWER SUPPLY COMPENSATION FOR AN ACTUATOR

BACKGROUND

The present disclosure pertains to power supplies and particularly to power supplies having compensated outputs. More particularly, the disclosure may pertain to power supplies for actuators.

SUMMARY

The disclosure reveals a mechanism for compensating power to a motor or actuator. Compensation may counter the effects of changing voltage levels of power to the motor and varying temperatures at the motor. An output of a wave generator may be input to a comparator along with a level of voltage representing the temperatures and voltage levels. An output may be a power signal for driving the motor at a constant speed and/or torque which can increase a maintenance-free lifetime of the motor and actuator.

DESCRIPTION

The present system and approach may incorporate one or more processors, computers, controllers, user interfaces, wireless and/or wire connections, and/or the like, in an implementation described and/or shown herein.

The present description may provide one or more illustrative and specific examples or ways of implementing the present system and approach. There may be numerous other examples or ways of implementing the system and approach.

The mechanism disclosed here may have application to actuators and particularly to actuators in heating, ventilation and air conditioning (HVAC) systems for buildings. Actuators may have a range of device input voltages (AC or DC) that they will accept for operation. In addition, they may have a wide range of temperatures that they need to operate in. But, the performance of designs may vary considerably as these factors change, even when they are within the specifications of the device. Often times, when these devices are given input voltage towards their high limit, they may drive at a faster rate and higher torque. When they are given input voltage towards their low limit, they may drive slower with less torque. The problem with torque and speed being affected by input voltage is that the actuator's performance for the end user may be a function of the voltage source for the device. This could be undesirable as the actuator should have consistent and repeatable operation for any user when the input voltage is within the wide range of input voltage specified for the device. Also, a device that consistently drives at higher speed and torque may encounter increased wear over time compared to a device that drives with nominal speed at nominal input voltage. A constant drive speed may ensure that the actuator opens in the same amount of time and at the same sound-decibel level over varying input voltages, increasing a perception of quality.

Varying device temperature may also have an effect on torque and speed. As the device temperature increases, the resulting drive speed and torque may decrease. As the device temperature decreases, driving speed and torque may increase. The problem with torque and speed being affected by temperature is that the actuator's performance may be a function of the climate of the installation location (e.g., rooftop in Arizona compared to Alaska). This may be also undesirable as the actuator should have consistent and repeatable operation when the temperature is within the specification for the device.

Finally, having the drive torque of the actuator vary based on input voltage and temperature makes the mechanical design of the actuator more complicated and costly. Large variances in internal loading have to be accounted for in the gear, spring and overall tolerance and spacings if the torque varies over voltage input and temperature conditions.

The present circuit may solve the problem by compensating for device input voltage (AC and DC) and temperature, simultaneously. Specifically, the present approach may sample the device input voltage and temperature, and then compute a percentage of power to be delivered to the motor as a function of those inputs. For example, for higher input voltage, the circuit may reduce power to the motor to keep speed and output torque constant. At higher temperature, the circuit may increase power to the motor to keep speed and output torque constant. The circuit may consist of analog and/or digital components to actively and continuously make this computation, for continuous compensation.

One way to implement the circuit may be to use a circuit which uses a standard triangle wave generator and a comparator to make a temperature compensated PWM signal, which drives the motor. The analog components highlighted are the present circuit that allows constant motor speed and torque over change of input voltage and temperature.

Another approach may be to use a digital microcontroller that controls the motor power. The microcontroller may sample the input voltage and the device temperature. Based on these readings, hardware and/or software may compensate the motor power to keep the actuator speed and torque constant over temperature and input voltage. By utilizing the processing approach, the overall mechanical design may be simplified since variances in temperature and input voltage no longer necessarily vary the mechanical workings of the device.

Figure 1:
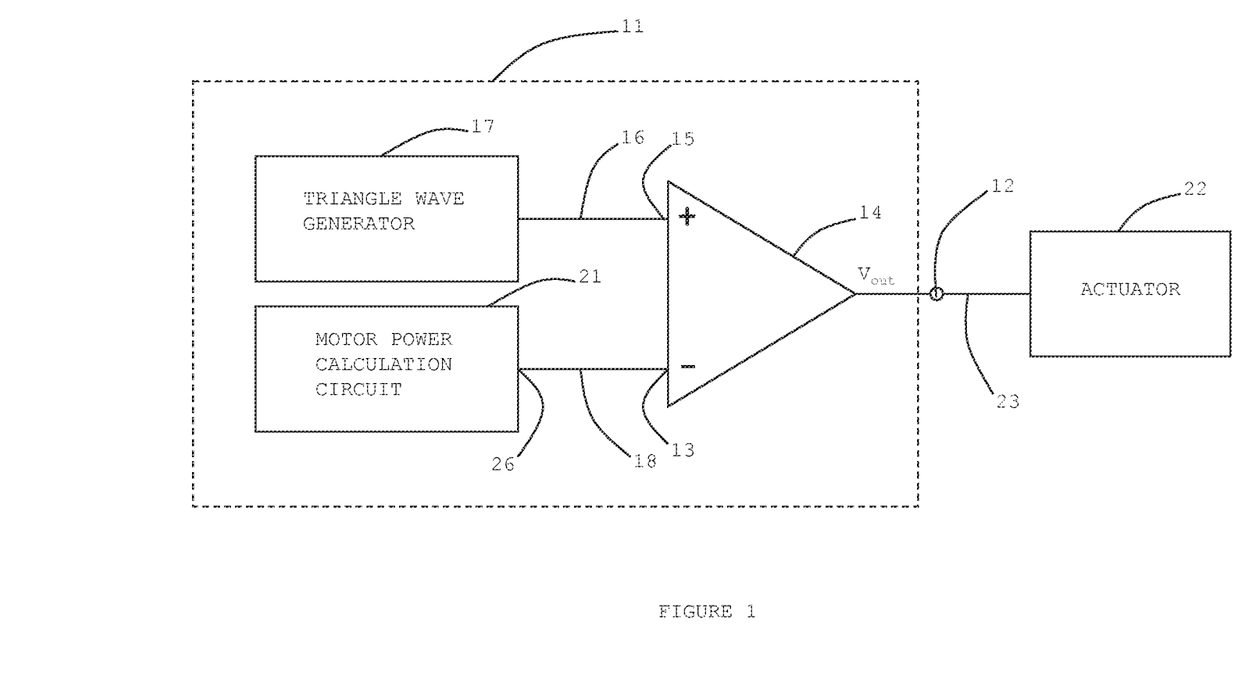
FIG. 1 is a diagram of a drive circuit having a compensated output.

FIG. 1 is a diagram of a drive circuit 11 for compensating a drive signal on an output 12 of circuit 11 for an actuator 22 in view of a changing temperature of an environment of actuator 22 and a varying supply voltage Vcc. A voltage Vo from a motor power calculation circuit 21 may be provided to an inverting input 13 of a comparator 14 in drive circuit 11. A triangle waveform 16 of voltage from triangle wave generator 17 may be provided to a non-inverting input 15.

Figure 2:
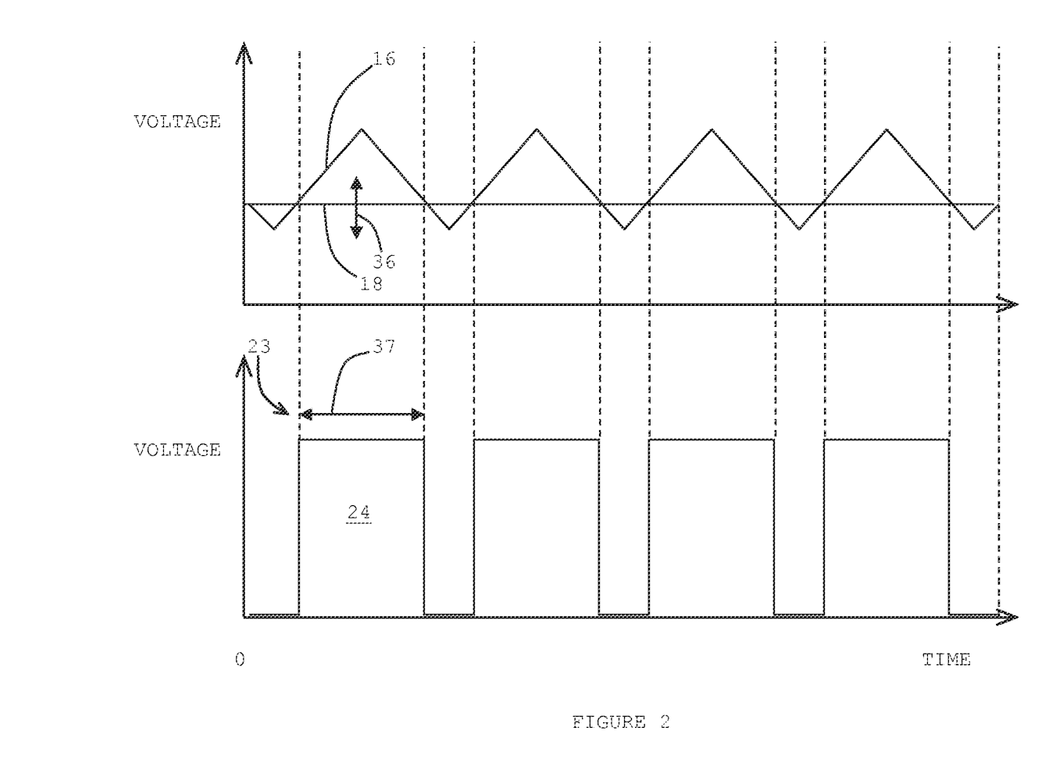
FIG. 2 is a diagram of a graph showing a voltage from a waveform generator to an input of a comparator and a voltage level signal from a calculation circuit to an input of the comparator.

FIG. 2 is a diagram of a graph showing a triangle wave voltage 16 from generator 17 to input 15 of comparator 14 and a voltage level signal 18 from calculation circuit 12 to input 13 of comparator 14. Signal 18 may move up and down relative to waveform signal 16 as indicated by arrow 36. When a point of wave 16 is positioned below voltage 18, output 12 has a signal 23 situated at a low level which may be a zero or minus voltage, since signal 18 overrides signal 16 and the positive voltage signal 18 is inverted to a negative signal because of the inverting input. When a point of wave 16 is positioned at a positive voltage above voltage 18, output 12 has a signal 23 situated at a high level which may be a positive voltage, since the input is a non-inverting input that retains the positive polarity aspect of the triangular wave 16. Signal 23 may appear to be a series of square-like pulses 24 on output 12. The pulses 24 may be widened or narrowed in shape, as indicated by arrow 37. Pulses 24 may be regarded as a pulse width modulated (PWM) signal 23. Pulses 24 may be as wide as the points at which the triangular wave 16 is above voltage level 18.

As voltage 18 increases at input 13, then the positive pulse 24 becomes narrower and thus the power from output 12 to an actuator or DC motor 22 of, for example, an actuator, may decrease. Voltage 18 may appear to correlate with the Vcc supply that would be provided to the power calculation circuit 21. Also, as the ambient temperature of motor 22 increases, then the voltage 18 output level may decrease. The decrease in voltage 18 level may result more of the triangular wave signal 16 being above the voltage 18. Thus, positive pulse of signal 23 would be wider and provide more power to motor 22. The extra power would compensate for increased temperature which would cause the motor to slow down slightly without the increased power. In this way, the motor speed may remain constant due to an increase in power to it in view of increased temperature.

Figure 3:
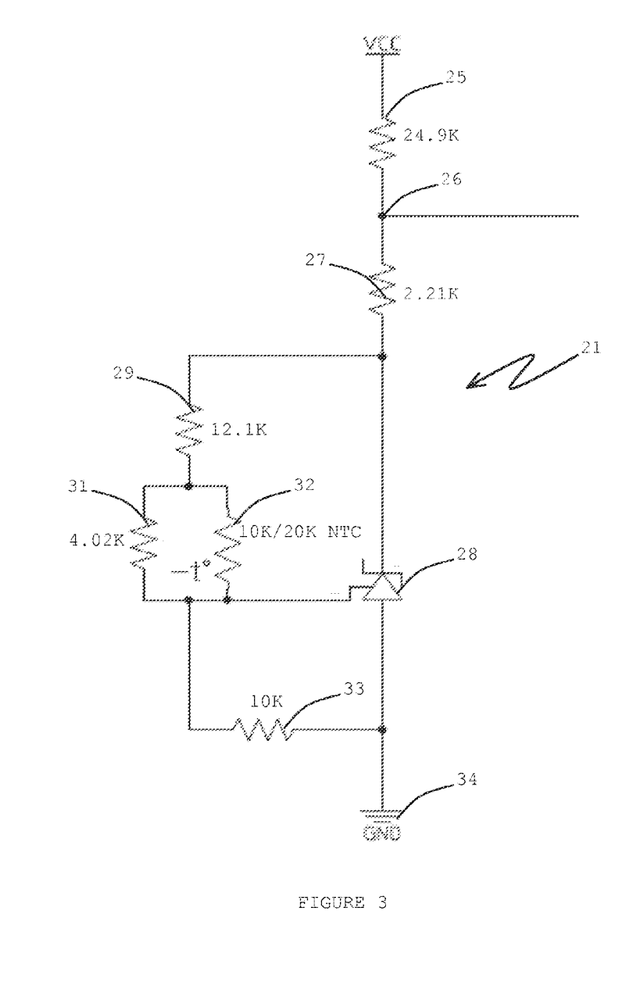
FIG. 3 is a diagram of a motor power calculation circuit.

FIG. 3 is a diagram of the motor power calculation circuit. The component values are illustrative examples but could be other values. A 24.9K ohm resistor 25 may have one end connected to Vcc of a power supply and another end connected to a terminal 26. Terminal 26 may be the output of circuit 21 that provides voltage 18 to input 13 of comparator 14. A 2.21K ohm resistor 27 may have one end connected to terminal 26 and another end connected to a cathode of an adjustable zener 28. Adjustable zener 28 may be a model LM431 available from various semiconductor vendors. The anode of adjustable zener 28 may be connected to a ground 34. The other end of resistor 27 may also be connected to one end of a 12.1K ohm resistor 29. The other end of resistor 29 may be connected to one end of a 4.02K ohm resistor 31 and to one end of a 10K to 20K ohm resistor 32 having a negative temperature coefficient (NTC). The other end of resistor 31 and the other end of resistor 32 may be connected to a third terminal of adjustable zener 28, with the cathode and anode being the other two terminals. Resistor 32 may have a B-constant of the NTC of 3380K ohms and a resistance of 10K ohms at an ambient temperature. A virtually constant 2.54 volts may appear between the third terminal and the anode during normal operation of adjustable zener 28. A 10K ohm resistor 33 may have one end connected to the third terminal of adjustable zener 28 and the other end to the anode of adjustable zener 28.

The circuit portion incorporating resistors 29, 31, 32 and 33 and adjustable zener 28 may have the third terminal being referred to as a voltage reference.

Figure 4:
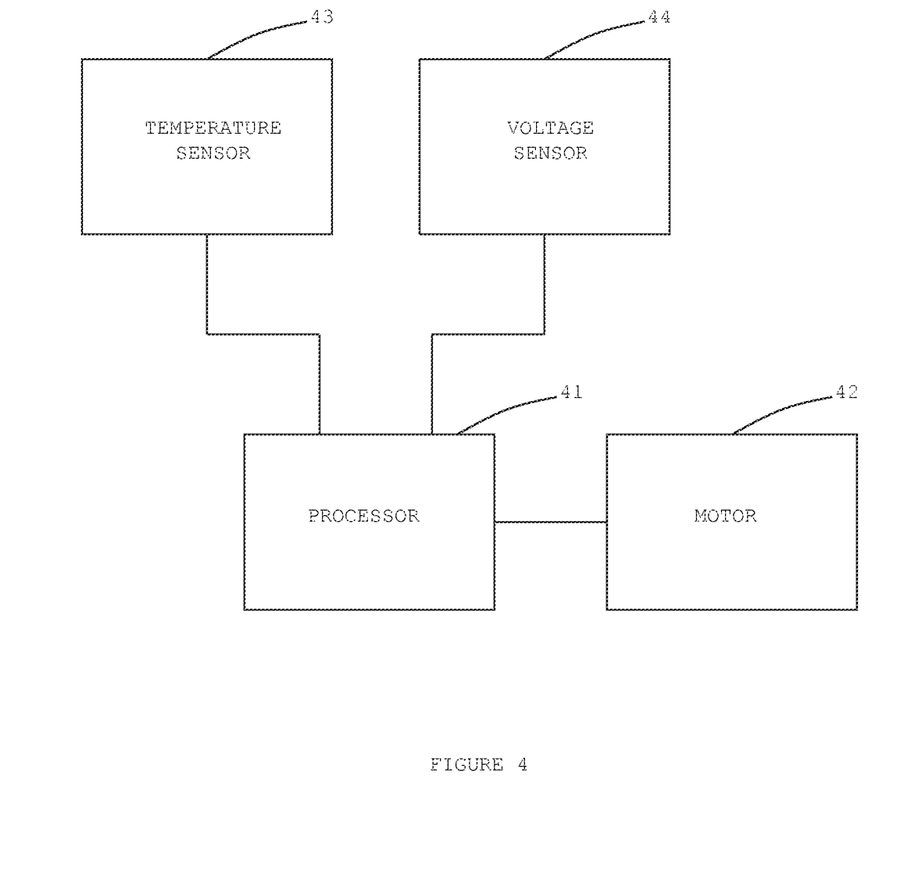
FIG. 4 is a diagram of a circuit having a processor or computer used for compensating power to a motor.

FIG. 4 is a diagram of a circuit having a processor or computer 41 used for controlling power to a motor 42. Temperature of motor 42 may be detected by sensor 43 and provided to computer 41. The input voltage may be detected by a sensor 44 and be input to computer 41. Based on the temperature and input voltage detected, computer 41 may provide compensation for the power of motor 42 to keep an actuator speed and torque constant over changes in temperature and input voltage. The motor may be used for or be a part of an actuator. An indication of a speed (via, e.g., a tachometer) of the motor may provided to the processor or computer that has, for instance, already adjusted the voltage to the motor according to the temperature of the motor and voltage of the power supply, to diagnostically confirm an adjustment of the voltage to the motor according to the temperature of the motor and the voltage of the power supply. The tachometer indication may instead precede the adjustment according to the voltage and temperature for confirmation or diagnostic purposes.

To recap, a power compensator for an actuator of a heating, ventilation and air conditioning system (HVAC), may incorporate a first source of voltage, a second source of voltage, and an operational amplifier. The first source may have a waveform generator. The second source of voltage may have a calculation circuit for power to an actuator. An output of the first source of voltage may be connected to a non-inverting input of the operational amplifier. An output of the second source of voltage may be connected to an inverting input of the operational amplifier. An output of the operational amplifier may be a third source of voltage that goes to the actuator.

An output of the third source of voltage may maintain a constant speed or torque of the actuator. An output of the second source of voltage may provide a signal that has an amplitude incorporating compensation in the output of the operational amplifier, for temperature of the actuator and a voltage of a power supply for the actuator.

The calculation circuit may incorporate a temperature sensitive impedance unit and a voltage sensitive unit. The temperature sensitive impedance unit may detect a temperature of the actuator. The voltage sensitive unit may detect an amount of the voltage of the power supply for the actuator.

The output of the first source of voltage may have a periodically varying waveform. The output of the third source of voltage may incorporate a pulse width modulated waveform. The operational amplifier may incorporate a gain configuration that makes the operational amplifier a comparator.

The output of the first source of voltage may have a triangular waveform. The output of the second source of voltage may increase in amplitude when the temperature of the actuator increases. The output of the second source of voltage may decrease in amplitude when the voltage of the power supply for the actuator increases.

The second source of voltage may incorporate a first impedance having one end connected to the input voltage of the power supply for the actuator and another end connected to the output of the second source of voltage, a second impedance having one end connected to the output of the second source of voltage and another end connected to a cathode of an adjustable zener, a third impedance having one end connected to the cathode of the adjustable zener and having another end connected to a reference voltage terminal of the adjustable zener, and a fourth impedance having a first end connected to the reference voltage terminal of the adjustable zener and having another end connected o an anode of the adjustable zener. The third impedance may have a negative temperature coefficient.

A system, for actuator speed control, may incorporate a variable amplitude wave generator, a power calculation circuit, and a comparator having a first input connected to an output of the variable amplitude wave generator, a second input connected to an output of the power calculation circuit, and an output for connection to a motor of an actuator. The variable amplitude wave may be periodic.

The power calculation circuit may incorporate a temperature sensitive component and a voltage sensitive component. The temperature sensitive component may detect a temperature of the motor. The voltage sensitive component may detect a voltage of a power supply for the motor. The output of the comparator may provide a compensated waveform of power for the motor.

The power calculation circuit may provide an output that compensates for the temperature of the motor and the voltage of a power supply for power to the motor.

The temperature sensitive component may cause an increase of output of the power calculation circuit when an increased temperature is detected by the temperature sensitive component. The voltage sensitive component may cause a decrease of output of the power calculation circuit when an increase of voltage is detected by the voltage sensitive component.

The power calculation circuit may incorporate an adjustable zener, a first impedance component having a first terminal connected to a cathode of the adjustable zener, and having a second terminal connected to a reference voltage terminal of the adjustable zener, and a second impedance component having a first terminal connected to the second terminal of the first impedance component and having a second terminal connected to an anode of the adjustable zener.

The power calculation circuit may further incorporate an impedance divider component having a first terminal for connection to the voltage of the power supply, a second terminal connected to the cathode of the adjustable zener, and having an output terminal as an output of the power calculation circuit.

The variable amplitude wave generator may output a triangular waveform of voltage at a predetermined frequency. The power calculation circuit may output a voltage that has an amplitude adjusted according to the temperature sensitive component and the voltage sensitive component.

An output of the comparator may incorporate a square wave that has a width which varies according to the amplitude of the voltage from the power calculation circuit. The wave may have other shapes.

The output of the comparator may be a pulse width modulated signal. The pulse width may be modulated to increase or decrease power to the motor according to the voltage of the power supply for the motor and the temperature of the motor.

A mechanism, for controlling power to a motor, may incorporate a processor, a temperature sensor that detects temperature of a motor for an actuator, and a voltage sensor that detects a voltage of a power supply for the motor. The temperature sensor may be connected to the processor. The voltage sensor may be connected to the processor. The processor may provide a signal that adjusts a voltage to the motor according to the temperature of the motor and a voltage of the power supply.

The processor may incorporate a program that calculates the voltage to the motor according to the temperature of the motor and the voltage of the power supply.

The voltage to the motor may be adjusted for the motor to operate the actuator at a constant speed.

The mechanism, for controlling power to a motor, may further incorporate a speed indicator such as a tachometer connected to the motor and the processor. An indication of a speed of the motor may be provided by the speed indicator to the processor that adjusts the voltage to the motor according to the temperature of the motor and voltage of the power supply, to diagnostically confirm an adjustment of the voltage to the motor according to the temperature of the motor and the voltage of the power supply.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A power compensator for an actuator of a heating, ventilation and air conditioning system (HVAC), comprising:
    a first source of voltage;
    a second source of voltage;
    an operational amplifier; and
    wherein:
    the first source comprises a waveform generator;
    the second source of voltage comprises a calculation circuit for power to an actuator;
    an output of the first source of voltage is connected to a non-inverting input of the operational amplifier;
    an output of the second source of voltage is connected to an inverting input of the operational amplifier;
    an output of the operational amplifier is a third source of voltage that goes to the actuator;
    an output of the third source of voltage maintains a constant speed or torque of the actuator; and
    an output of the second source of voltage provides a signal that has an amplitude incorporating compensation in the output of the operational amplifier, for temperature of the actuator and a voltage of a power supply for the actuator.

2. The compensator of claim 1, wherein the calculation circuit comprises:
    a temperature sensitive impedance unit; and
    a voltage sensitive unit.

3. The compensator of claim 2, wherein:
    the temperature sensitive impedance unit detects a temperature of the actuator; and
    the voltage sensitive unit detects an amount of the voltage of the power supply for the actuator.

4. The compensator of claim 1, wherein:
    the output of the first source of voltage has a periodically varying waveform; and
    the output of the third source of voltage comprises a pulse width modulated waveform.

5. The compensator of claim 4, wherein the operational amplifier comprises a gain configuration that makes the operational amplifier a comparator.

6. The compensator of claim 4, wherein the output of the first source of voltage has a triangular waveform.

7. The compensator of claim 1, wherein:
    the output of the second source of voltage increases in amplitude when the temperature of the actuator increases; and
    the output of the second source of voltage decreases in amplitude when the voltage of the power supply for the actuator increases.

8. The compensator of claim 1, wherein the second source of voltage comprises:
    a first impedance having one end connected to the input voltage of the power supply for the actuator and another end connected to the output of the second source of voltage;
    a second impedance having one end connected to the output of the second source of voltage and another end connected to a cathode of an adjustable zener;
    a third impedance having one end connected to the cathode of the adjustable zener and having another end connected to a reference voltage terminal of the adjustable zener; and a fourth impedance having a first end connected to the reference voltage terminal of the adjustable zener and having another end connected o an anode of the adjustable zener; and wherein the third impedance has a negative temperature coefficient.

9. A system for actuator speed control, comprising:

a variable amplitude wave generator;

a power calculation circuit; and a comparator having a first input connected to an output of the variable amplitude wave generator, a second input connected to an output of the power calculation circuit, and an output for connection to a motor of an actuator; and wherein the power calculation circuit comprises:
- a temperature sensitive component; and
- a voltage sensitive component; and
- wherein:
  - the temperature sensitive component detects a temperature of the motor;
  - the voltage sensitive component detects a voltage of a power supply for the motor; and
  - the output of the comparator provides a compensated waveform of power for the motor.

10. The system of claim 9, wherein the power calculation circuit provides an output that compensates for the temperature of the motor and the voltage of a power supply for power to the motor.

11. The system of claim 9, wherein:
the temperature sensitive component causes an increase of output of the power calculation circuit when an increased temperature is detected by the temperature sensitive component; and
the voltage sensitive component causes a decrease of output of the power calculation circuit when an increase of voltage is detected by the voltage sensitive component.

12. The system of claim 9, wherein the power calculation circuit comprises:
an adjustable zener;
a first impedance component having a first terminal connected to a cathode of the adjustable zener, and having a second terminal connected to a reference voltage terminal of the adjustable zener; and
a second impedance component having a first terminal connected to the second terminal of the first impedance component and having a second terminal connected to an anode of the adjustable zener.

13. The system of claim 12, further comprising an impedance divider component having a first terminal for connection to the voltage of the power supply, a second terminal connected to the cathode of the adjustable zener, and having an output terminal as an output of the power calculation circuit.

14. The system of claim 12, wherein an output of the comparator comprises a square wave that has a width which varies according to the amplitude of the voltage from the power calculation circuit.

15. The system of claim 9, wherein:
the variable amplitude wave generator outputs a triangular waveform of voltage at a predetermined frequency; and
the power calculation circuit outputs a voltage that has an amplitude adjusted according to the temperature sensitive component and the voltage sensitive component.

16. The system of claim 15, wherein:
the output of the comparator is a pulse width modulated signal; and
the pulse width is modulated to increase or decrease power to the motor according to the voltage of the power supply for the motor and the temperature of the motor.

17. The system of claim 9, further comprising:
a tachometer connected to the motor and the power calculation circuit; and
wherein an indication of a speed of the motor is provided by the tachometer to the power calculation circuit that adjusts a voltage to the motor according to the temperature of the motor and voltage of the power supply, to diagnostically confirm an adjustment of the voltage to the motor according to the temperature of the motor and the voltage of the power supply.

* * * * *